United States Patent [19]
Wilcher

[11] Patent Number: 5,888,158
[45] Date of Patent: Mar. 30, 1999

[54] SPROCKET USED IN WASTEWATER TREATMENT FACILITIES

[75] Inventor: Stephen B. Wilcher, Harleysville, Pa.

[73] Assignee: U.S. Filter Wastewater Group, Inc., Palm Desert, Calif.

[21] Appl. No.: 784,463

[22] Filed: Jan. 16, 1997

[51] Int. Cl.⁶ .................................................. F16H 55/12
[52] U.S. Cl. .............................. 474/95; 474/98; 403/344
[58] Field of Search ................................ 474/95, 96, 97, 474/98, 99; 74/450; 403/344, 329

[56] References Cited

U.S. PATENT DOCUMENTS

| | | | |
|---|---|---|---|
| 1,219,382 | 3/1917 | Dunlap | 474/98 |
| 1,229,927 | 6/1917 | Forshey | 474/98 |
| 3,159,047 | 12/1964 | Dable | 474/96 X |
| 4,144,773 | 3/1979 | Addicks | 474/161 |
| 4,218,932 | 8/1980 | McComber | 474/161 |
| 4,506,559 | 3/1985 | Francke et al. | 74/439 |
| 4,631,974 | 12/1986 | Wiegand et al. | 74/450 |
| 4,805,388 | 2/1989 | Kell | 474/164 X |
| 4,964,842 | 10/1990 | Howard | 474/96 X |
| 5,131,890 | 7/1992 | Hertel et al. | 474/161 X |
| 5,160,020 | 11/1992 | Thomas, Sr. | 474/155 X |
| 5,213,203 | 5/1993 | Kinney et al. | 198/850 |
| 5,279,526 | 1/1994 | Gundlach | 474/95 |
| 5,295,917 | 3/1994 | Hannum | 474/95 |

FOREIGN PATENT DOCUMENTS

| | | |
|---|---|---|
| 1521342 | 8/1978 | United Kingdom . |
| 2182752 | 5/1987 | United Kingdom . |
| 2274143 | 7/1994 | United Kingdom . |
| PCTWO 83/01 | 4/1983 | WIPO . |

OTHER PUBLICATIONS

*FMC Quality Components*, FMC Corporation Product Brochure, Chicago, IL, No Date.
*Polychem Engineered Non–metallic NCS–720–S Chain; Cast Nylon Sprockets & Corrosion Resistant Systems & Components*, Polychem Corp. Product Brochure, Phoenixville, PA, Jun. 1995.
Budd *"Quick Lock Sprocket"* (*QLS*), The Budd Company Product Ad, Phoenixville, PA, No Date.

*Primary Examiner*—Thomas R. Hannon
*Attorney, Agent, or Firm*—Michael, Best & Friedrich

[57] ABSTRACT

There is provided a sprocket for use in a wastewater treatment facility comprising a first portion, a second portion, and at least one fastener which snap locks the first portion to the second portion. There is also provided a sprocket for use in a wastewater treatment facility comprising at least one lightening hole, the sprocket being formed of non-metallic material.

27 Claims, 4 Drawing Sheets

FIG. 3A
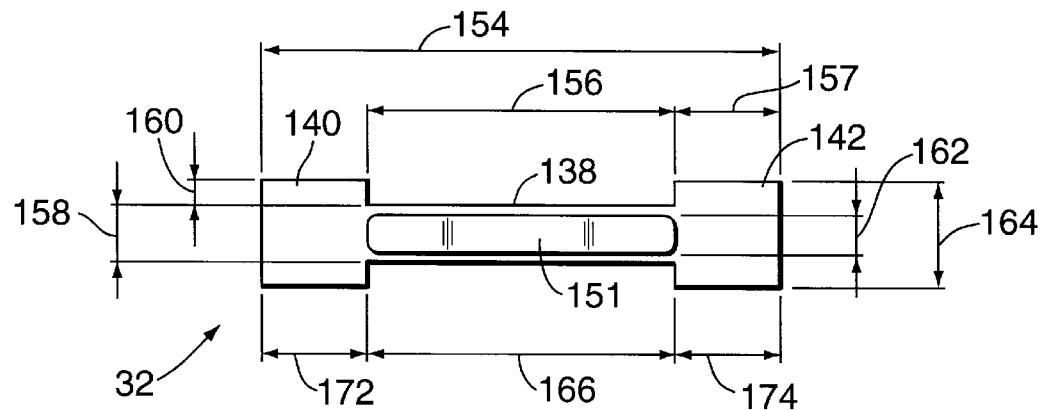
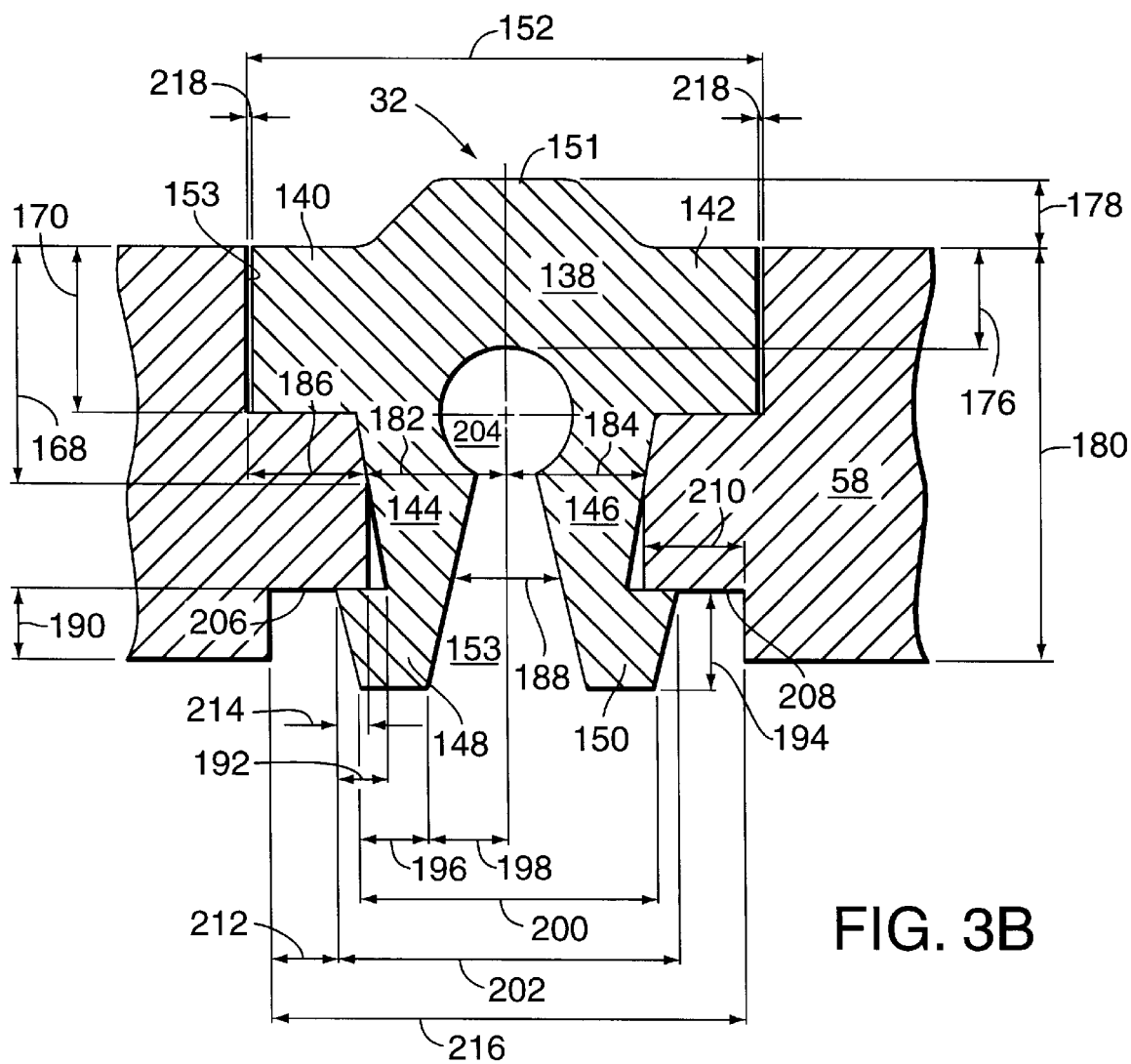
FIG. 3B

FIG. 4A
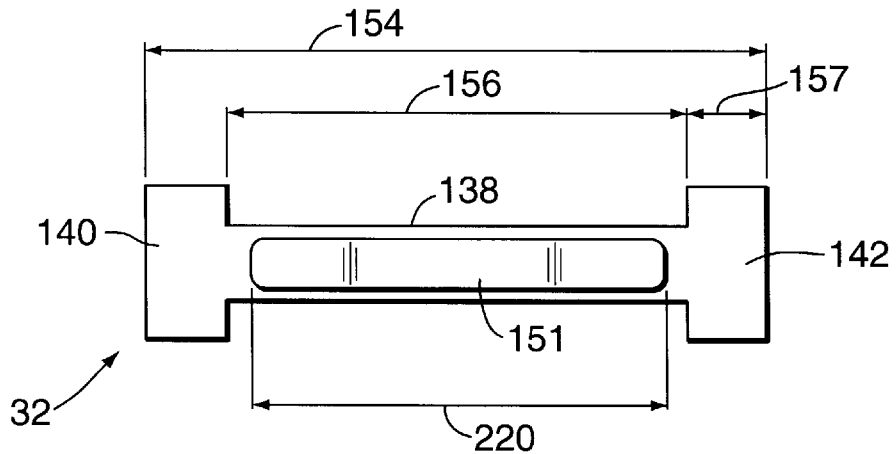
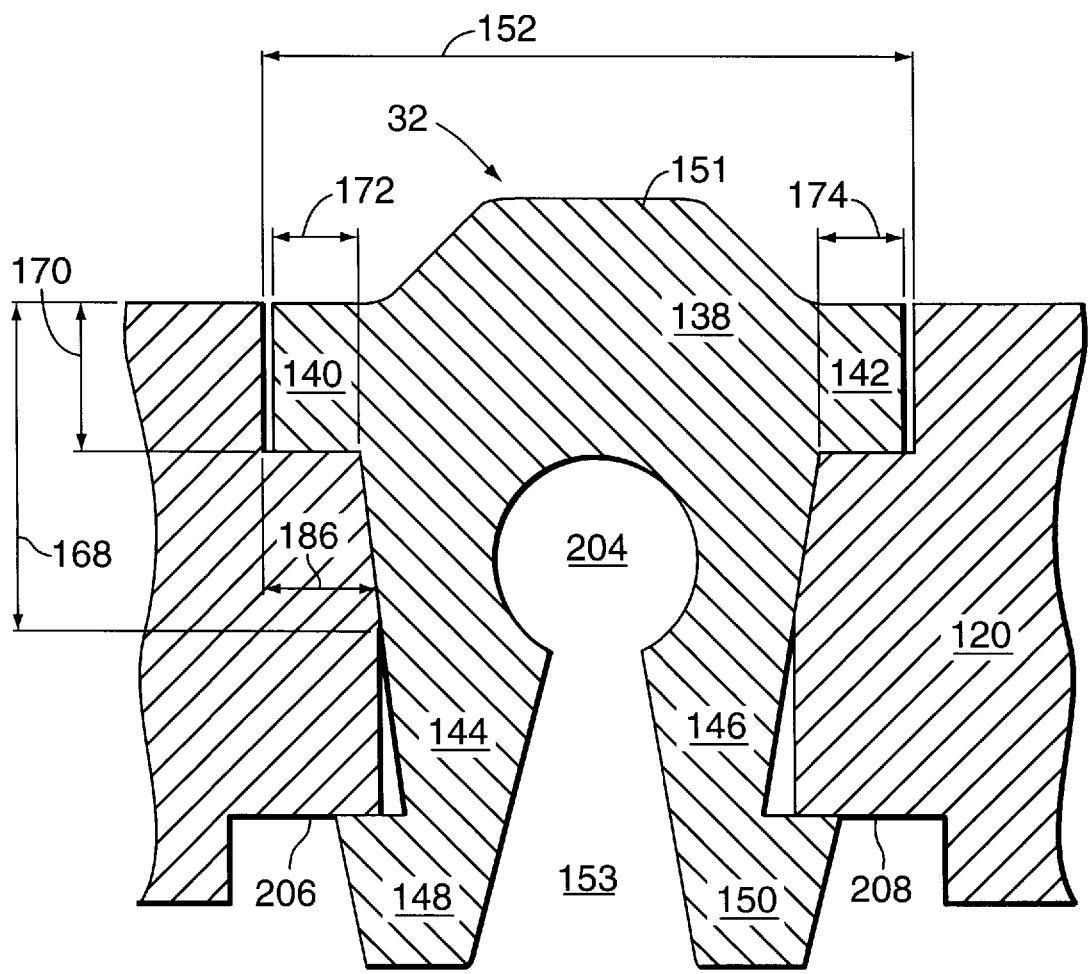
FIG. 4B

SPROCKET USED IN WASTEWATER TREATMENT FACILITIES

BACKGROUND OF THE INVENTION

1. Field of the Invention

This invention relates to sprockets more particularly to non-metallic sprockets used in wastewater treatment facilities.

2. Description of Related Art

Sludge collectors are commonly used in wastewater treatment plants to scrape the settled sludge from the bottom of the settling tank and also to skim floating waste off the surface of the wastewater. These sludge collectors typically include a number of sludge flights which are usually elongated members that extend the width of the tank. The ends of the flights are connected to conveyor chains which carry the flights in a circuit lengthwise along the bottom of the tank and back over the surface of the water to perform the scraping and skimming functions. The tanks are typically made of concrete and the supporting shafts with bearings and locking collars support the transmission sprockets which in turn power the conveyor chain and flight systems.

Sprockets in a sludge collector generally consist of three types. The first may be the keyseated and setscrewed driving or transmission type. The second may be the loose or free wheeling type. Further, the third may be the setscrewed only type.

Referring now to FIG. 1, there is shown a prior art sprocket 10 having a plurality of teeth 12 used in connection with wastewater treatment facilities. The sprocket 10 comprises a bore 14 having a keyway 16. The sprocket 10 is formed of two sections 18 and 20. The sections 18 and 20 are joined at the line 22 via bolts 24 and locknuts 25. The bolts 24 may be secured in flanges 26 in each of the sections 18 and 20.

The bolts 24 and locknuts 25 utilized are typically made of stainless steel. Due to the fact that stainless steel is a relatively soft material, the bolt threads may become destroyed by the locknuts when disassembling the sprockets for maintenance or replacement. As a result, it is desirable to have a fastener for securing the sections 18 and 20 not subjected to damage and expensive replacement which may be reused.

SUMMARY OF THE INVENTION

There is provided a sprocket for use in a wastewater treatment facility comprising a first portion, a second portion, and at least one fastener which snap locks the first portion to the second portion. There is also provided a sprocket for use in a wastewater treatment facility comprising at least one lightening hole, the sprocket being formed of non-metallic material.

BRIEF DESCRIPTION OF THE DRAWINGS

FIG. 3A is a top view of the hub key of FIG. 2. FIG. 3B is a cross sectional view of the hub key and further showing a portion of the sprocket hub taken along the lines I—I of FIG. 2.

FIG. 4A is a top view of the rim split key of FIG. 2. FIG. 4B is a cross sectional view of the rim split key and further showing a portion of the sprocket hub taken along the lines II—II of FIG. 2.

DESCRIPTION OF THE PREFERRED EMBODIMENTS

Figure 1:
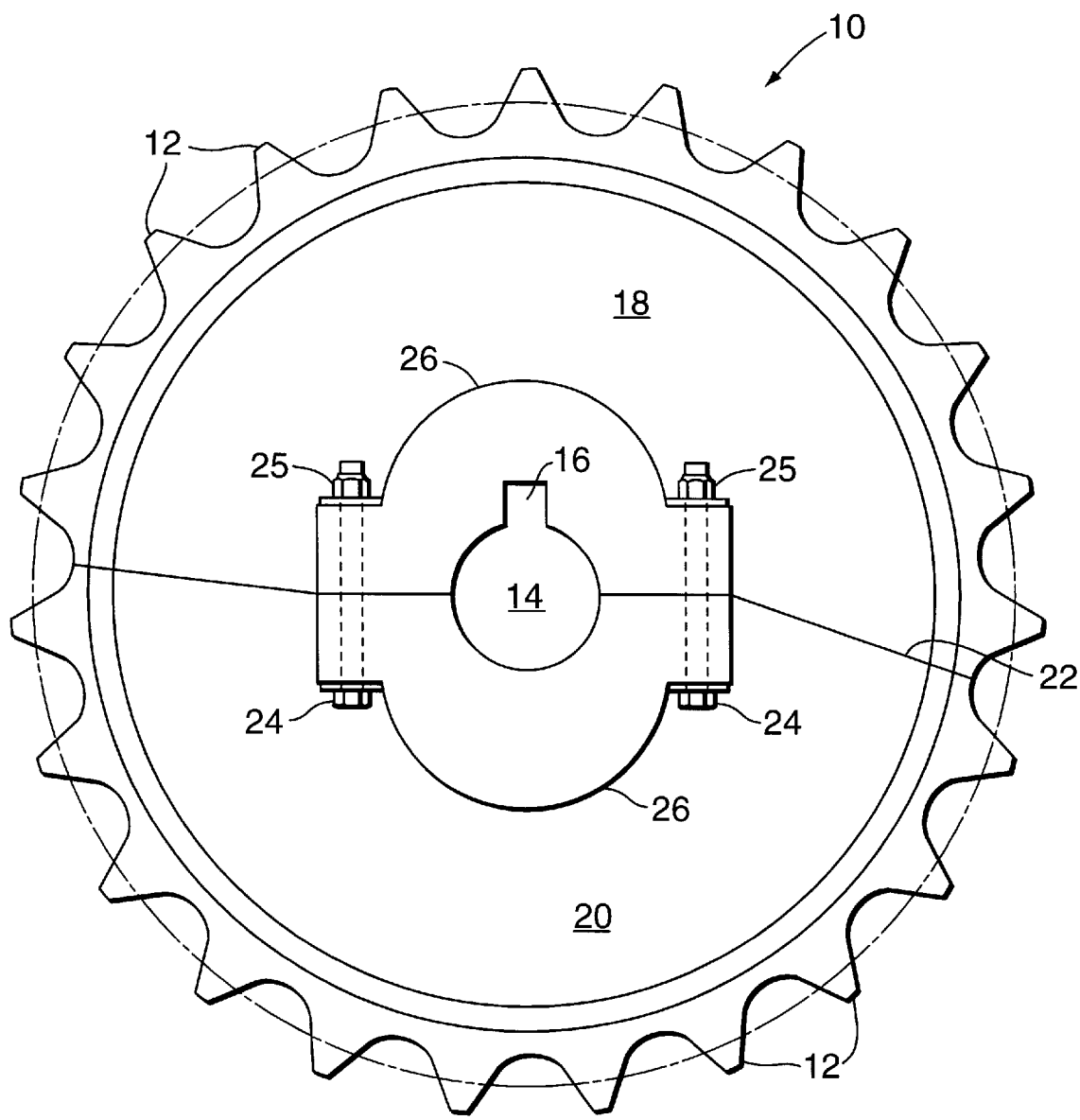
FIG. 1 is an end view of a prior art sprocket.
Figure 2:
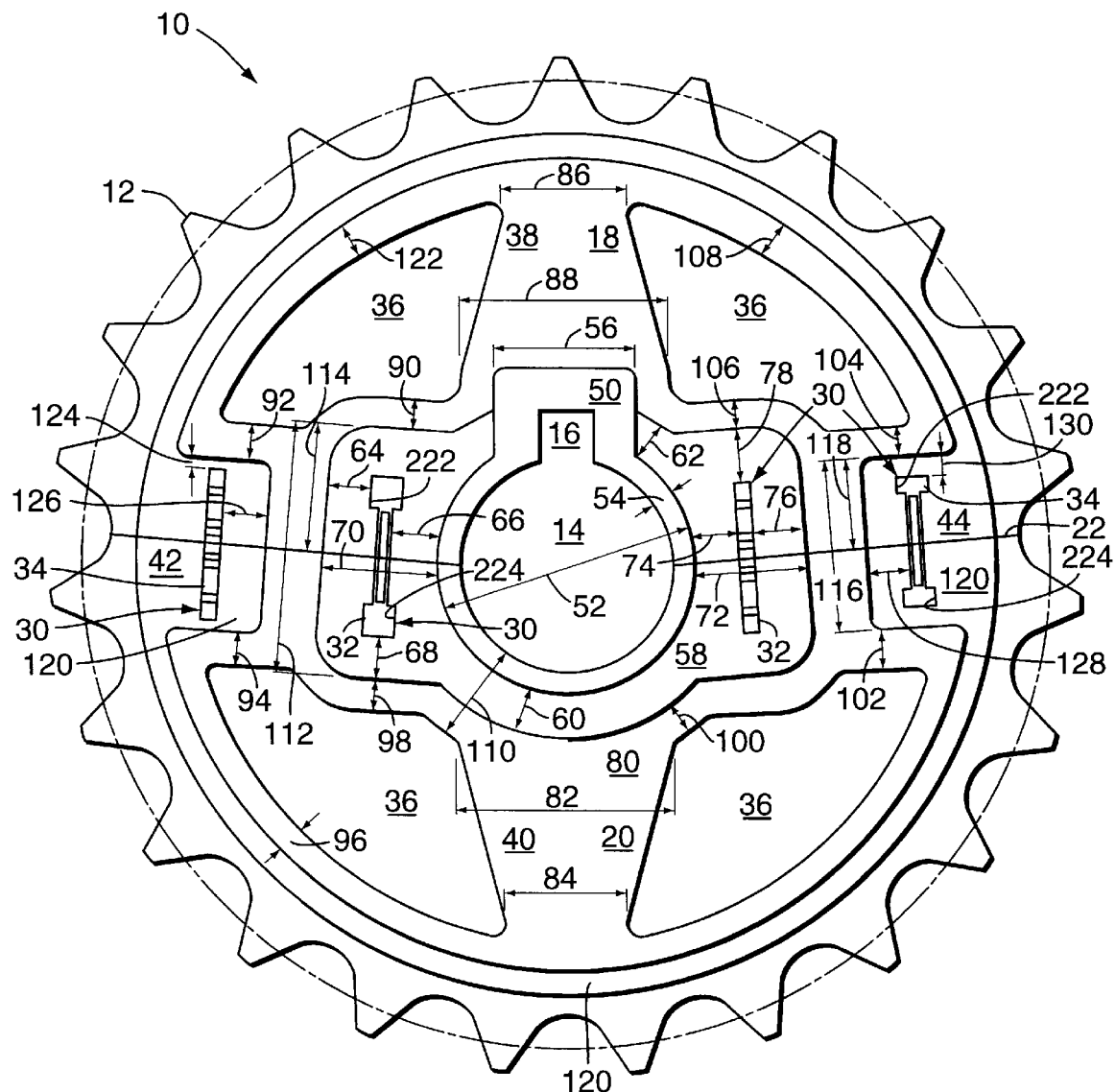
FIG. 2 is an end view of the sprocket of the present invention.

Referring now to FIG. 2, there is provided an end view of the sprocket 10 of the present invention. Similar components have been labeled similarly for purposes of clarity.

The sprocket 10 is formed of two sections 18 and 20. The sections 18 and 20 are joined at the line 22 by one or more fasteners 30. The fasteners 30 may comprise a hub key 32 as well as a rim split key 34. Preferably, the split keys 34 are toward the exterior of the sprocket 10 and the hub keys 32 are toward the interior of the sprocket 10. Further, preferably the split keys 34 and hub keys 32 are inserted from alternate sides of the sprocket 10 as shown in FIG. 2. As will be described, preferably the keys 32 and 34 are single piece members which provide a snap lock.

In order to lighten the weight of the sprocket 10 and to reduce amount of material forming the sprocket, the interior portion of the sprocket 10 may comprise one or more lightening holes 36. As a result, the sprocket 10 comprises a wheel having spokes 38, 40, 42, and 44. As shown, spokes 42 and 44 are formed by the joining of sections 18 and 20.

Where, for example, a shaft having a diameter of 4.9375 inches is used, a central hub portion 50 may have a dimension 52 of 5.9375 inches, a dimension 54 of 0.5 inches, a dimension 56 of 3.25 inches, and a thickness of 5.0 inches. The thickness of the central hub portion 50 is such that it may be capable of transmitting torque provided by a shaft to the sprocket 10.

A second hub portion 58 may surround the central hub portion 50 and may have a thickness of 3.0 inches. The second hub portion 58 may have a hub key 32 at each side of the central hub portion 50. The dimensions of the second hub portion 58 and the placement of the hub keys 32 may, for example, be such that there is a dimension 60, 62, 64, 66, and 68 of 1.0 inches, a dimension 70 and 72 of 2.5625 inches, a dimension 74 of 1.0 inches, a dimension 76 of 1.1875, and a dimension 78 of 1.125 inches.

A third hub portion 80 may surround the second hub portion 58 and may have a thickness of 1.0 inches. The third hub portion 80 may have a dimension 82 of 5.0 inches, a dimension 84 and 86 of 2.75 inches, a dimension 88 of 4.75 inches, a dimension 90, 92, 94, 96, 98, 100, 102, 104, 106, and 108 of 0.75 inches, a dimension 110 of 2.25 inches, a dimension 112 of 5.75 inches, a dimension 114 of 2.875 inches, a dimension 116 of 4.0 inches, and a dimension 118 of 2.0 inches.

A chain saver flange 120 may surround the third hub portion 80 and may have a thickness of 3.0 inches. The chain saver flange 120 may have a rim split key 34 at each side of the central hub portion 50. The dimensions of the chain saver flange 120 and the placement of the split keys 34 may, for example, be such that there is a dimension 122 of 0.5 inches, a dimension 124 of 0.25 inches, a dimension 126 and 128 of 1.0 inches, and a dimension 130 of 0.5 inches.

The sprocket 10 may, for example, also have a maximum outer diameter of 23.5 inches, a pitch diameter of 22.24 inches, and a flange outer diameter of 19.6875. Further, the teeth 12 may have a thickness of one inch. Preferably, the line 22 occurs on the centerline of the tooth 12 pocket.

Now referring to FIGS. 3A and 3B, there is shown the hub key or fastener 32 of the present invention. The hub key 32 preferable comprises a main body 138 having shoulders 140 and 142 as well as legs 144 and 146 which extend from the main body 138. Further, preferably, the key 32 further comprises feet 148 and 150 which extend from each of the legs 144 and 146. The key 32 may also comprise a head 151.

The hub key 32 as well as the bore or slot 153 in the second hub portion 58 for receiving the hub key 32 resulting from the joining of the portions 18 and 20 may, for example, have a dimension 152 of 3.8125 inches, a dimension 154 of 3.75 inches, a dimension 156 of 2.25 inches, a dimension 157 of 0.75 inches, a dimension 158 of 0.375 inches, a dimension 160 of 0.1875 inches, a dimension 162 of 0.25 inches, a dimension 164 of 0.75 inches, a dimension 166 of 2.0 inches, a dimension 168 of 1.875 inches, a dimension 170 of 1.25 inches, a dimension 172, 174 and 176 of 0.75 inches, a dimension 178 of 0.5 inches, a dimension 180 of 3.0 inches, a dimension 182 and 184 of 1.0 inches, a dimension 186 of 0.90625 inches, a dimension 188 of 0.4375 inches, a dimension 192 of 0.375 inches, a dimension 194 of 0.75 inches, a dimension 196 of 0.5 inches, a dimension 198 of 0.5625 inches, a dimension 200 of 2.125 inches, and a dimension 202 of 2.5 inches. Further, bore 204 within main body 138 may have a radius of 0.5 inches.

Bore 153 in the second hub portion 58 is preferably sized to allow the key 32 to be snap locked into the second hub portion 58 of the sprocket 10. The feet 148 and 150 of the key 32 may rest upon ledges 206 and 208, respectively, of the second hub portion 58. The ledge 206 and 208 may have a dimension 210 of 0.75 inches. Further, the distance 212 from one side of the ledge 206 to the tip of the foot 148 may be 0.5 inches and the distance 214 from the tip of the foot 148 to the opposing side of the ledge 206 may be 0.25 inches. Moreover, the distance 216 from ledge 206 to ledge 208 may be 3.5 inches and the height 190 of the ledge 206 and 208 from the edge of the second hub portion 58 may be 0.5 inches. There may also be a distance 218 between the second hub portion and the key 32 of 0.03125 inches.

Now referring to FIGS. 4A and 4B, there is shown the split key or fastener 34 of the present invention. Rather than being secured to the second hub portion 58 as with the hub key 32, the split key 34 may be secured to the chain saver flange 120. The dimensions of the split key 34 may be similar to the dimensions of the hub key 32 except for the dimensions related to the shoulders 140 and 142 to be described. Further, the ledge dimensions 206 and 208 of the chain saver flange 120 may be similar to the ledge dimensions 206 and 208 of the second hub portion 58.

Specifically, dimension 152 may be 3.0625 inches, dimension 154 may be 3.0 inches, dimension 156 may be 2.25 inches, dimension 157 may be 0.375 inches, dimension 168 may be 1.625 inches, dimension 170 may be 0.75 inches, dimension 172 and 174 may be 0.375 inches, and dimension 186 may be 0.53125 inches. There may also be a dimension 220 of 2.0 inches between the edges of the head 151.

As best seen in FIGS. 3A and 4A, the top of the keys 32 and 34 are I-shaped (i.e., the shoulders 140 and 142 allow for an I-shaped top cross section of the keys 32 and 34). The respective portion of either the second hub portion 58 or the chain saver flange 120 has a cut away dimension to allow receipt of the I-shape of the keys 32 and 34. As a result, the section of either the second hub portion 58 or chain saver flange 120 has an I-shaped slot for receiving the keys. Each of the portions 18 and 20 may be aligned at line 22. Then, a hammer or the like may be used to force the keys 32 and 34 into slots or bores 153. The slots or bores 153 result from joining the slots 222 and 224 in sections 18 and 20, respectively, as shown in FIG. 2.

Because of bore 204, the legs 144 and 146 may slightly move inward, allowing the keys 32 and 34 to be inserted into the slots 153. Once the tips of the feet 148 and 150 pass ledges 206 and 208, respectively, the keys 32 and 34 may then be snap locked into place. Further, because the top portion of the keys 32 and 34 may be I-shaped and because the corresponding portion of the sprocket portions 18 and 20 when joined provide a complementary I-shaped slot, the portions 18 and 20 may be securely fastened together.

Should it be desirable to separate the portions 18 and 20, the keys 32 and 34 may be removed by applying force to move the feet 148 and 150 toward one another and then pushing the feet 148 and 150 out and away from ledges 206 and 208 until the keys 32 and 34 are removed. Further, the keys 32 and 34 may be reused as well.

The shoulders of the hub key 32 are preferably thicker than the shoulders of the split key 34 because the hub keys 32 should be capable of taking the full torque transmitted from the shaft to the sprocket 10. The split keys 34 because of their position in the sprocket 10 do not have to withstand the same torque that the hub keys 32 withstand and thus the shoulders may be thinner in proportion. Rather, the split keys 34, as with the hub keys 32, help to ensure that the sections 18 and 20 remain fastened together.

Preferably the sprocket 10 is molded of non-metallic material such as UHMW polyethylene. The UHMW polyethylene is preferably virgin material certified in accordance with ASTM specification D-4020-81, with a molecular weight of 4.0 million or greater, a relative abrasion resistance of twelve, an intrinsic viscosity of twenty four or greater, and a water absorption of zero. Further, the keys 32 and 34 may also molded of the same non-metallic material of UHMW polyethylene. However, the sprocket 10 and keys 32 and 34 may be cast or made of metal.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A sprocket for use in a wastewater treatment facility comprising:

a first portion;

a second portion; and at least one fastener;

wherein said fastener snap locks said first portion to said second portion and wherein said fastener comprises a main body having two opposing shoulders, two legs extending from said main body, and feet extending from each of said legs.

2. The invention of claim 1 wherein said fastener is formed of a single piece of material.

3. The invention of claim (1) wherein said fastener has an I-shaped top cross section and is received by a corresponding I-shaped slot, said I-shaped slot resulting when said first and second portions are joined together.

4. The invention of claim (1) wherein said feet are snap locked to ledges in said first and second portions.

5. The invention of claim 1 wherein one of said first portion and said second portion comprises at least one lightening hole.

6. The invention of claim 1 wherein said sprocket is formed of non-metallic material.

7. The invention of claim 6 wherein said fastener is formed of non-metallic material.

8. The invention of claim 6 wherein said fastener is formed of metallic material.

9. A sprocket for use in a wastewater treatment facility comprising:

at least one lightening hole, said sprocket being formed of non-metallic material wherein said sprocket further comprises a first portion, a second portion, and at least one fastener, said fastener snap locking said first portion to said second portion; and wherein said fastener comprises a main body having two opposing shoulders, two legs extending from said main body, and feet extending from each of said legs.

10. The invention of claim 9 wherein said sprocket is formed of UHMW polyethylene.

11. The invention of claim 9 wherein said sprocket comprises at least two spokes.

12. The invention of claim 9 wherein said fastener is formed of a single piece of material.

13. The invention of claim 9 wherein said fastener has an I-shaped top cross section and is received by a corresponding I-shaped slot, said I-shaped slot resulting when said first and second portions are joined together.

14. A sprocket for use in a wastewater treatment facility, said sprocket having an outside surface, opposite sides, an interior and an exterior, said sprocket further comprising:

a first section and a second section, said first section mechanically joined to said second section, said first section having a slot located between the interior and exterior of said sprocket, said second section having a slot located between the interior and exterior of said sprocket; and a fastener which mechanically joins said sections together, said fastener positioned within the slots of said first and second sections, respectively, the slots properly sized to receive said fastener, wherein said fastener comprises a main body having two opposing shoulders, two legs extending from said main body, and feet extending from each of said legs.

15. The sprocket as set forth in claim 14 wherein said fastener is formed of a single piece of material.

16. The sprocket as set forth in claim 14 wherein said fastener has an I-shaped top cross section and is received by a corresponding I-shaped slot, said I-shaped slot resulting when said first and second sections are joined together.

17. The sprocket as set forth in claim 14 wherein said feet are mechanically connected to ledges in said first and second sections.

18. The sprocket as set forth in claim 14 wherein one of said first section and said second section comprises at least one lightening hole.

19. The sprocket as set forth in claim 14 wherein said sprocket is formed of nonmetallic material.

20. The sprocket as set forth in claim 19 wherein said fastener is formed of nonmetallic material.

21. The sprocket as set forth in claim 19 wherein said fastener is formed of metallic material.

22. The sprocket as set forth in claim 14 wherein said sprocket is formed of UHMW polyethylene.

23. The sprocket as set forth in claim 14 wherein said sprocket comprises at least two spokes.

24. The sprocket as set forth in claim 14 wherein said first section further comprises a second slot located between the interior and exterior of said sprocket and wherein said second section has a second slot located between the interior and exterior of said sprocket; and a second fastener, said second fastener positioned within the second slots of said first and second sections, respectively, the second slots properly sized to receive said second fastener.

25. The sprocket of claim 24 wherein said first section further comprises a third slot and a fourth slot located between the interior and exterior of said sprocket and wherein said second section has a third slot and a fourth slot located between the interior and exterior of said sprocket; and a third fastener and a fourth fastener, said third fastener being positioned within the third slots of said first and second sections, respectively, and said fourth fastener being positioned within the fourth slots of said first and second sections, respectively, the third and fourth slots properly sized to receive the respective fasteners.

26. The sprocket of claim 25 wherein two of the four slots in the first section and two of the four slots in the second section are positioned towards the interior of said sprocket, one of the two slots of the first section and one of the two slots of the second section being located on one side of a center axis of said sprocket, and the other slot of the two slots of the first section and the other slot of the two slots of the second section being located on the other side of the center axis; and wherein the remaining two of the four slots of the first section and the remaining two of the four slots of the second section are positioned towards the exterior of said sprocket, one of the remaining slots of the first section and one of the remaining slots of the second section being located on one side of the center axis of said sprocket, and the last slot of the remaining slots of the first section and the last slot of the remaining slots of the second section being located on the other side of the center axis.

27. The sprocket of claim 26 wherein each of said fasteners has a separate top head;

wherein the two fasteners positioned in the slots located towards the interior of said sprocket are inserted into the alternate sides of said sprocket such that the top head of one of such two fasteners is located on one side of said sprocket and the top head of the other such fastener is located on the other side of said sprocket; and wherein the two fasteners positioned in the slots located towards the exterior of said sprocket are inserted into the alternate sides of said sprocket such that the top head of one of such two fasteners is located on one side of said sprocket and the top head of the other such fastener is located on the other side of said sprocket.

* * * * *